(12) United States Patent
King et al.

(10) Patent No.: US 8,001,920 B2
(45) Date of Patent: Aug. 23, 2011

(54) AUTOMATIC FOOD PRODUCT BREADING APPARATUS

(75) Inventors: Donald E. King, Louisville, KY (US); James Bell, Louisville, KY (US); Chad Harned, Louisville, KY (US)

(73) Assignee: AYR-KING Corporation, Louisville, KY (US)

( * ) Notice: Subject to any disclaimer, the term of this patent is extended or adjusted under 35 U.S.C. 154(b) by 1238 days.

(21) Appl. No.: 11/670,574

(22) Filed: Feb. 2, 2007

(65) Prior Publication Data

US 2007/0196547 A1     Aug. 23, 2007

Related U.S. Application Data

(60) Provisional application No. 60/775,192, filed on Feb. 21, 2006.

(51) Int. Cl.
*A23G 3/26* (2006.01)
*B05C 3/08* (2006.01)

(52) U.S. Cl. ............ 118/13; 118/19; 118/303; 118/418; 366/227; 9/494

(58) Field of Classification Search ............... 118/13, 118/19, 303, 418; 366/227, 59, 225, 228, 366/229; 99/494
See application file for complete search history.

(56) References Cited

U.S. PATENT DOCUMENTS

| 1,876,224 | A | * | 9/1932 | Harding ..................... 118/19 |
| 2,422,989 | A | * | 6/1947 | Skoog ........................ 366/221 |
| 2,845,040 | A | * | 7/1958 | Ray .............................. 118/13 |
| 3,735,726 | A | | 5/1973 | Butler |
| 3,739,743 | A | | 6/1973 | McKee, Jr. |
| 3,855,965 | A | | 12/1974 | Gordon |
| 5,051,169 | A | | 9/1991 | King |
| 5,265,525 | A | | 11/1993 | Stewart |
| 5,664,489 | A | | 9/1997 | Herrick, IV |
| 5,937,744 | A | | 8/1999 | Nothum, Sr. et al. |
| 6,952,992 | B2 | | 10/2005 | Riubrugent |
| 2004/0149147 | A1 | | 8/2004 | Bayus et al. |

* cited by examiner

*Primary Examiner* — Laura Edwards
(74) *Attorney, Agent, or Firm* — Maginot, Moore & Beck, LLP

(57) ABSTRACT

An apparatus for coating or breading food products, such as chicken parts, includes a rotating drum with end caps closing the loading and discharge ends of the drum. Apertures are defined in the end caps for the passage of the food product, in which the apertures are situated along the central axis of the drum. A spiral grate inside the drum receives the food product and conveys it toward the discharge end. The spiral grate supports the food product proximate the central axis so that the product is more fully and uniformly coated with the particulate material. The spiral grate is configured with a gap at the discharge end so that a portion of a discharge ramp may be disposed within the gap to receive the prepared food product for discharge.

16 Claims, 11 Drawing Sheets

AUTOMATIC FOOD PRODUCT BREADING APPARATUS

CROSS REFERENCE TO PROVISIONAL APPLICATION

This application claims the benefit of U.S. Provisional Application No. 60/775,192, filed on Feb. 21, 2006.

BACKGROUND OF THE INVENTION

This invention relates generally to the field of food processing and more particularly to the field of an apparatus to apply coatings or breadings to food products.

Many food products are covered with a coating or breading to enhance the flavor and facilitate cooking of the product. Where preparation time is not of great concern, the food product, such as a chicken breast, can be manually coated by rolling the chicken breast in the coating material and patting or massaging the coating material directly on the chicken. Manual breading or coating is well-known to provide the most complete and uniform coverage for a particular food item.

However, in commercial settings where preparation time is of the essence, manual breading has given way to machines that automatically coat a food product. Food product coating machines come in different varieties that are often dependent upon the type of food being breaded. Many commercial and fast-food restaurants use a drum type breader to coat food, such as parts of chicken, with a breading or fine flour mixture. One type of breader is represented in U.S. Pat. No. 5,265,525 to Stewart. This breader unit includes a tilted rotatable drum with an apertured interior wall that is configured to tumble the food parts as they are gravity fed to the output end of the drum. In a variation of this concept, elements are affixed to the interior wall of the rotating drum to help tumble the food parts as they progress along the length of the drum, as depicted in U.S. Pat. No. 5,937,744 to Nothum, Sr. et al. While many drum breaders rely on gravity to propel the food parts from the input to the output end, others utilize a rotating spiral to help push the food along its breading path, as illustrated in U.S. Pat. No. 3,855,965.

Such traditional drum breaders and the associated equipment often provide an insufficient or inconsistent coating as the traditional breaders often compartmentalize the food from the coating and only dump or sprinkle the coating onto the food. Traditional breaders also typically require a lot of floor space which poses two problems in the restaurant environment. First, the floor space taken up by the automated breader is floor space that is unusable for any other purpose. In a kitchen environment, any floor space tends to be premium. Second, if the breading apparatus were to malfunction, no value added process can occur at that station.

There is a need for an automatic coating or breading apparatus that can apply a consistently even coating to food parts. Optimally, the apparatus would emulate manual coating, while doing so in a high production, quick turnaround setting. There is a further need for a breading apparatus that minimizes the amount of floor space used and that does not create dead space when it is not being used.

SUMMARY OF THE INVENTION

In order to address these needs, the present invention provides an apparatus for coating a food product that comprises a drum configured for rotation around a longitudinal central axis of the drum and having a loading end for receiving a food product and a discharge end for the discharge of coated food product therefrom. A generally spiral grate extends within the drum from adjacent the loading end to adjacent the discharge end. The spiral grate has a center rod extending substantially along the longitudinal central axis of the drum. The drum and spiral grate are rotated by a drive mechanism.

In the preferred embodiment, the spiral grate is engaged with the drum to rotate therewith. As the grate rotates, it conveys the food product along the length of the drum. In one aspect of the illustrated embodiments, the spiral grate includes a plurality of radially disposed rods supported by and spaced along the center rod of the grate. The plurality of radially disposed rods are angularly offset relative to each other so that the rods form a spiral configuration. In a specific embodiment, the angular offset of the rods is about 5.5 degrees. The rods are also spaced along the length of the rod, by about $11/16$ inch in one specific embodiment. This spacing has been found to be optimum for food product such as chicken parts to be breaded.

The apparatus may further comprise a loading ramp disposed adjacent the loading end and configured to guide food product placed on the loading ramp into the drum. In certain embodiments, the loading ramp is supported at a downward angle toward the drum relative to the longitudinal central axis of the drum. The apparatus may further include a discharge ramp adjacent the discharge end of the drum and configured to convey food product discharged from the drum away from the drum. The discharge ramp can be supported at a downward angle away from the drum relative to the longitudinal central axis of the drum. In some embodiments, the discharge ramp is a wire grate.

In a further aspect of the illustrated embodiments, the spiral grate may define a radial gap relative to the longitudinal central axis adjacent the discharge end of the drum. The discharge ramp is supported so that a portion of the ramp is disposed within the radial gap. In this way, the discharge ramp plucks the food products directly from the spiral grate as the grate conveys the product to the discharge end.

The apparatus preferably includes end caps closing the loading and discharge ends of the drum. Each of the end caps defines an aperture for the passage of food product therethrough. In the preferred embodiments, the aperture in each of the end caps is centered on the longitudinal central axis.

In a further aspect of the invention, a food coating apparatus is provided that comprises a drum configured for rotation around a longitudinal central axis of the drum and having a loading end for receiving a food product and a discharge end for the discharge of coated food product therefrom. The drum includes an end cap closing the end of the drum at the discharge end. The end cap defines a discharge opening centered on the longitudinal central axis having a diameter less than an inner diameter of the drum. A spiral auger extends within the drum from adjacent the loading end to adjacent the discharge end and is configured to convey the food product along the drum as it rotates toward the discharge opening. With this feature, the food products are maintained generally within the center of the drum so that the product can be fully and uniformly coated with the coating or breading material.

In yet another aspect, the invention contemplates a method for coating a food product comprising introducing the food product and a particulate coating material into a loading end of a drum rotating about a longitudinal central axis of the drum; conveying the food product from the loading end to a discharge end of the drum while supporting the food product immediately proximate the central axis of the drum; and discharging the food product from the drum at a discharge opening immediately proximate the central axis of the drum.

It is one object of the invention to provide an apparatus and method for automatically coating or breading a food product. It is a further object for the apparatus and method to provide as uniform and complete coating to the product as possible.

One benefit of the present invention is that it coats or breads a food product so completely that it resembles hand breading. Another benefit is that the apparatus can be easily disassembled and cleaned after each use. A further benefit is that the reduced size of the apparatus frees floor space for use in other value added processes if necessary. These and other objects and benefits of the invention will be readily discerned from the following written description, taken together with the accompanying figures.

DETAILED DESCRIPTION OF THE PREFERRED EMBODIMENT

Figure 1:
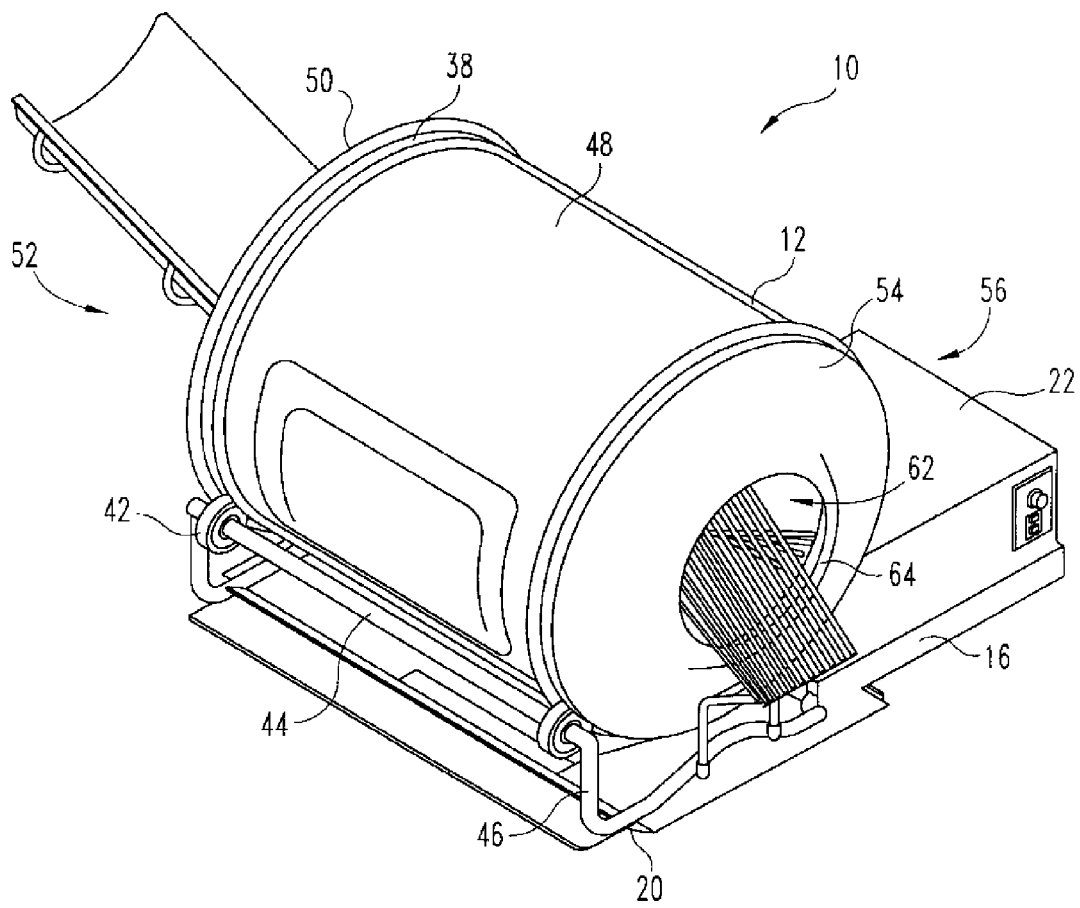
FIG. 1 is a perspective view of a food coating apparatus according to one embodiment of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

A food coating apparatus 10 in accordance with one embodiment of the invention is depicted in FIG. 1. The apparatus 10 may be used in a commercial setting, such as at a fast-food restaurant, for high-volume coating of food products such as chicken parts, fish parts, vegetables, and the like. The coating could be any of a number of coating types such as bread crumbs, flour, corn meal, etc.

The apparatus 10 includes a drum assembly 12 that is rotatably mounted to a table (not shown) or stand or similar structure at the facility. The apparatus may be supported on an existing table at the facility, provided with its own stand, or mounted on a flour sifting table similar to that described in U.S. Pat. No. 5,051,169. The apparatus 10 is supported so that the longitudinal axis of the drum assembly 12 is generally parallel to the work surface of the table.

Figure 3:
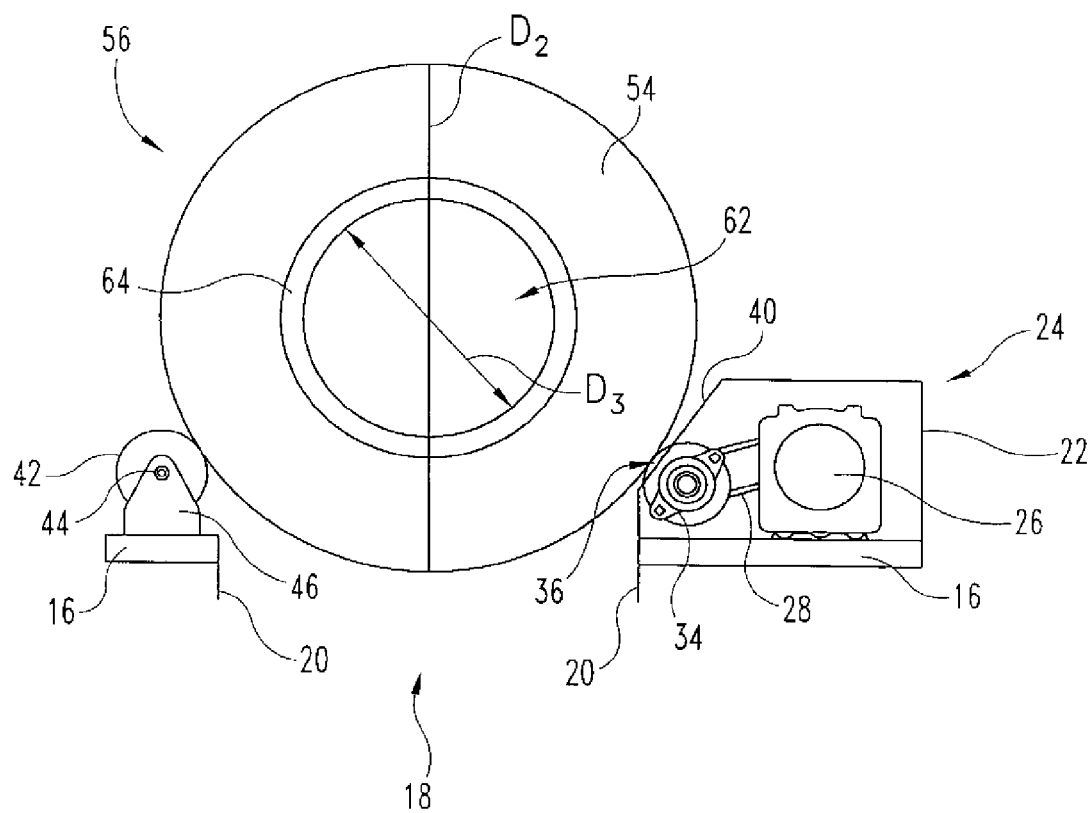
FIG. 3 is a front view of the drum assembly and drive mechanism of the apparatus shown in FIG. 1.

The apparatus may be mounted to a plate 16 to provide an interface between the table and the drum assembly 12. The plate 16 can be formed from any material suitable for food preparation but preferably a stainless steel. Preferably, the plate 16 is provided with an opening 18 (best shown in FIG. 3) that is arranged to align with a comparable opening in the sifting table to allow food coating material to pass into a collection bin (not shown) under the table. In one embodiment, the plate 16 is of a rectangular construction and includes a flange 20 on each longitudinal edge of the aperture 18, as shown in FIG. 3. Disposing the flanges 20 into the aperture 18 on the sifting table locates the drum assembly 12 over the aperture 18 to allow for optimum utilization of the sifting table features. Other locating means are also contemplated by the invention. In an alternative embodiment, locating pins (not shown) may be used to locate the plate 16 over the corresponding holes in the sifting table (not shown). It should be noted, however, that use of a sifting table is not required for the present invention.

Figure 2A:
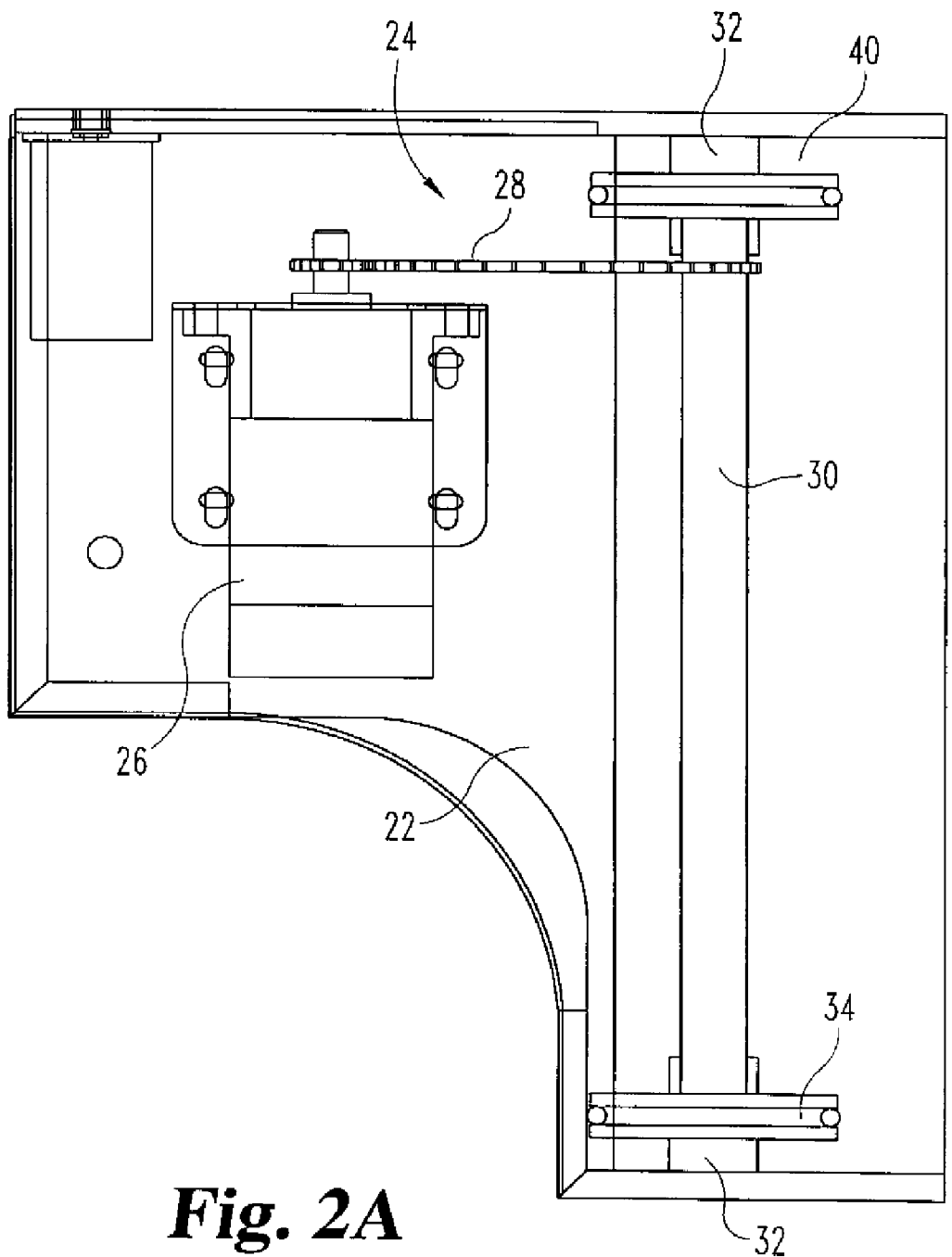
FIG. 2A is a top view of a drive mechanism for use with the coating apparatus shown in FIG. 1.
Figure 2B:
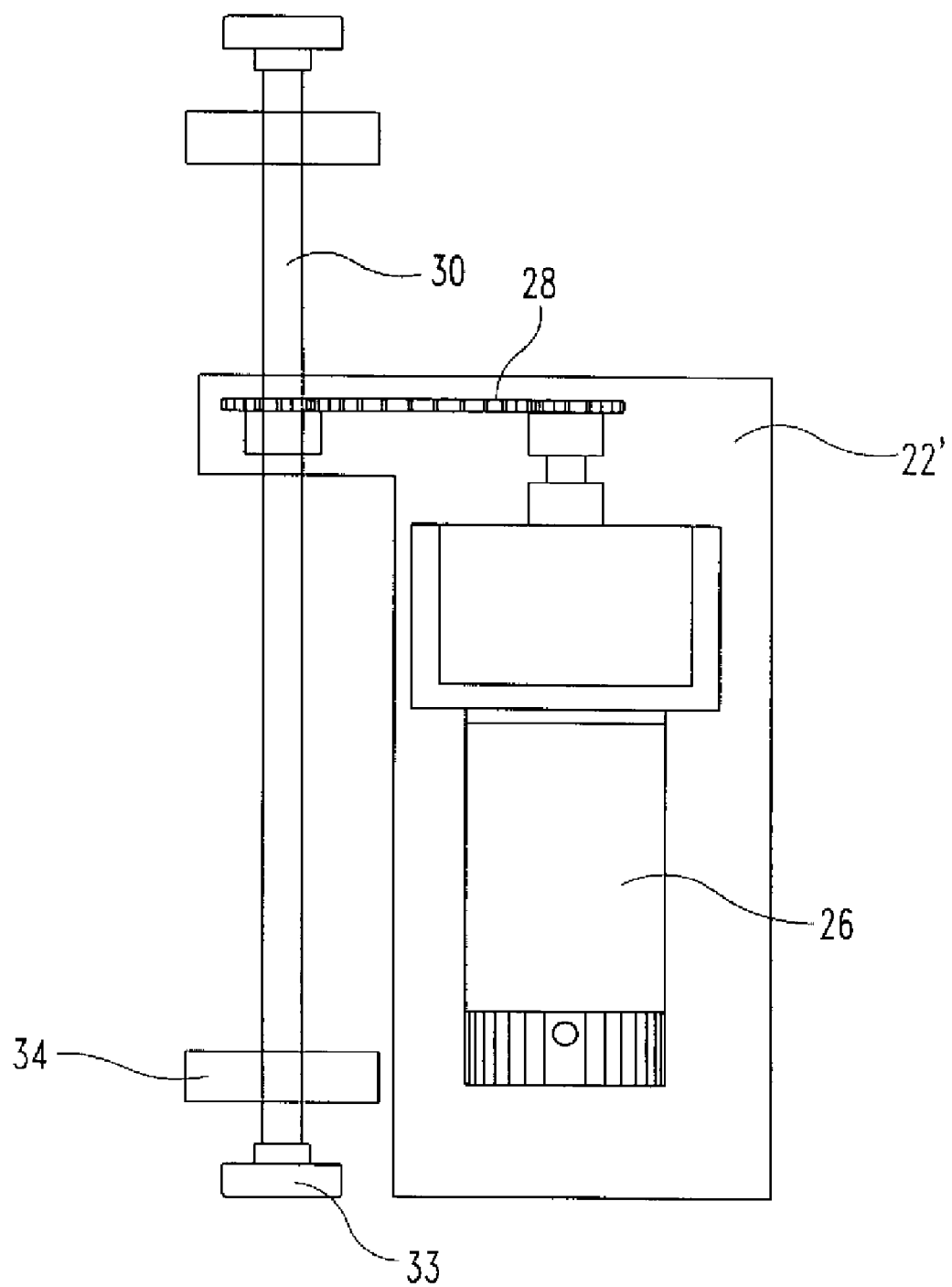
FIG. 2B is a top view of an alternative motor housing for use with the coating apparatus shown in FIG. 1.

Mounted to the plate 16 is a motor housing 22 which contains the drive mechanism 24 for rotating the drum assembly 12. The drive mechanism 24 can include a motor 26 that drives a drive train 28, which may include a chain, belt, gear train or any other similar mechanism, to turn a drive shaft 30, as illustrated in FIGS. 2-3. The drive shaft 30 in the illustrated embodiment extends longitudinally and spans the distance between a plurality of drive wheels 34 that contact and drive the drum assembly 12. The wheels 34 are spaced to suitably support the drum assembly and to produce even rotation of the drum about its longitudinal axis. The drive shaft 30 is rotatably supported by corresponding bearings 32 mounted to the housing 22 or plate 16 by any suitable means known in the art. In one embodiment, the bearings are mounted to the motor housing wall, as shown in FIG. 2A. In an alternative embodiment, the drive shaft 30 is supported by bearing brackets 33 mounted to the plate 16 as shown in FIG. 2B.

The motor housing 22 is preferably located along one longitudinal edge of the plate 16 and extends essentially the same distance longitudinally as the drive shaft 30. The housing 22 as shown in FIGS. 2A and 3 is configured to cover the drive components such that rotation of the drum assembly 12 is not impeded. Therefore, in one embodiment, the housing 22 has a cross section area similar to that of a rectangle, but with the facing wall 40 closest to the drum assembly 12 angled to prevent interference with the rotation of the drum assembly 12. In the embodiment of FIGS. 1 and 3, the facing wall 40 of the motor housing 22 defines openings 36 that coincide with the drive wheels 34 so that the wheels may directly contact the drum assembly 12. The housing 22 is configured to encase the drive mechanism 24 and protect the mechanism 24 from exposure to the particulate material, such as flour or breading, tumbling within the drum assembly 12. In an alternative embodiment, the motor housing 22 is rectangular in shape to cover the motor 26 and drive mechanism 28, but does not cover the drive shaft 30 or wheels 34. In this embodiment, the cover 22' is formed to cover the components of the drive mechanism 28 which would be the most adversely affected by particulate infiltration such as the drive chain, belt, or gear train 28 and the motor 26 as shown in FIG. 2A.

The drum assembly is supported on one side by the drive wheels 34 and on the opposite side by casters 42 mounted to the plate 16, as shown in FIGS. 1 and 3. The casters 42 are mounted such that they are always in rotational contact with the drum assembly 12. In a preferred embodiment, two casters 42 are mounted to the plate 16 spaced apart to stably support the drum assembly 12 and to contact the drum bands 38 described above. It can be appreciated that different arrangements of casters 42 are contemplated by the invention. For instance, the casters 42 may be replaced by a continuous roller (not shown) extending between brackets 46. The casters 42 can be mounted to the plate 16 in any number of suitable ways known in the art, so long as the casters 42 allow the rotation of the drum assembly 12. In one embodiment, the casters 42 are fastened on center to an axle 44 and the axle 44 is rotatably mounted to brackets 46 on either side of the caster 42. These brackets 46 are fastened to the plate 16 in any suitable manner, such as welding, bolting, etc.

To rotate the drum assembly 12, the motor 26 is activated, which turns the belt, chain, or gears 28, to rotate the drive shaft 30, which in turn rotates the drive wheels 34. The drive wheels 34, being in contact with the drum assembly 12, in turn rotate the drum assembly 12 in a direction opposite that of the drive wheels 34. To effect this rotation, drum bands 38 may be mounted on the drum assembly 12 in line to contact the drive wheels 34 and casters 42. These drum bands 38 are made preferably of an elastomer which increases the coefficient of friction between the drive wheels 34 and the drum assembly 12 thereby decreasing slippage of the drum assembly. Each drum band 38 extends around the outer circumference of the drum assembly 12 and has substantially the same width as the corresponding drive wheel. Alternatively, the drive wheels 34 may be made of a material, preferably silicon, to increase the friction imparted on the drum assembly 12 and reduce or eliminate slippage. Similarly, the drum bands 38 and drive wheels 34 may be used together by choosing complementary materials or geometries to reduce or eliminate slippage. For instance, a wheel 34 with a channel and a corresponding drum band 38 with a surface feature to cooperate with the channel may be used.

Figure 4:
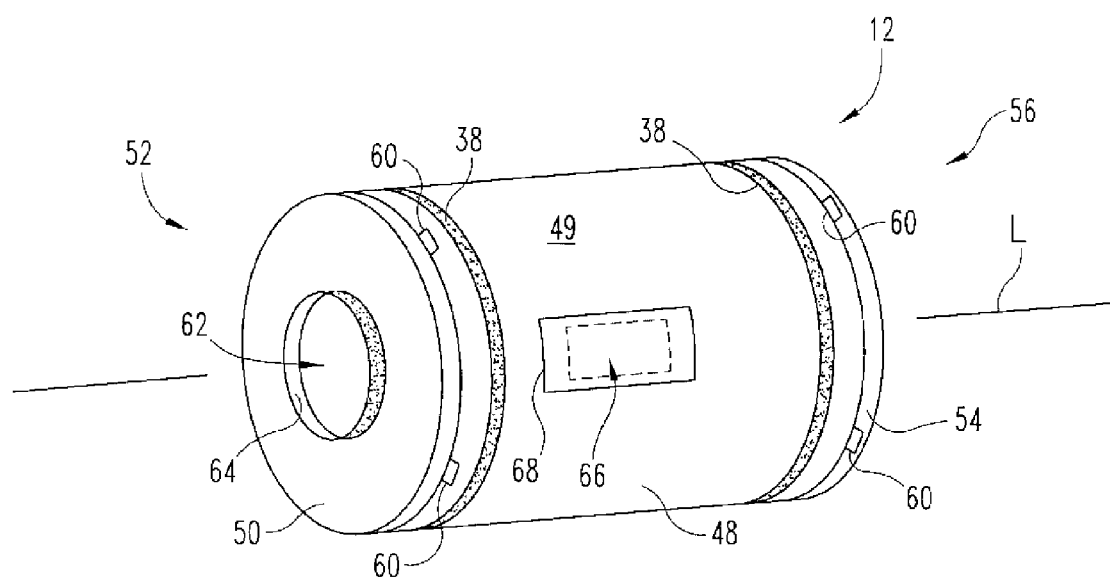
FIG. 4 is a perspective view of the drum assembly of the apparatus shown in FIG. 1.

As shown in FIG. 4, the drum assembly 12 includes a drum body 48 which is of cylindrical construction, and most preferably in the form of a right circular cylinder to facilitate rotation of the drum body 48 by the wheels 36 and casters 42. The drum body 48 is made from any material suitable for food preparation, such as stainless steel. The drum body 48 is hollow and its ends may be closed by a first end cap 50 at the loading end 52 and a second end cap 54 at the discharge end 56 of the drum. At least one and preferably both of the end caps 50, 54 are removably attached to the drum body 48 to form an enclosed container that can be opened for cleaning. Each end cap 50, 54 is sized and configured to snugly fit the end of the drum body 48 to form a sealed container. Thus, in the illustrated embodiment, the end caps are circular in configuration. An annular gasket (not shown) may be employed between each end cap 50, 54 and the drum body 48 to prevent infiltration or leakage to or from the drum assembly 12.

In one embodiment, each end cap 50, 54 is attached to the drum body 48 by a snap on design as illustrated in FIG. 1. For example, each end cap 50, 54 may be constructed of a polymer material and configured so as to fit snugly onto the ends of the drum body 48. In a further embodiment a series of clasps or latches 60 may be employed to retain the end caps 50, 54 as shown in FIG. 4. It can be appreciated that the end caps 50, 54 may be connected to the drum body 48 using a variety of clasping mechanisms 60, although it is preferable that the mechanisms 60 be quickly and easily opened and closed. In one embodiment, the latches 60 may be spring loaded pins that extend through corresponding holes in the drum body 48 to hold each end cap 50, 54 onto the drum.

Each end cap 50, 54 defines an aperture 62 and a concentric collar 64. The aperture 62 is preferably circular in shape and is generally in the center of the end cap 50, 54 and aligned with the longitudinal axis L of the drum body 48. The aperture 62 allows for the loading and discharge of food parts. The collar 64 is formed on each end cap 50, 54 by known means such as forming, fastening, or welding. The collars 64 add stiffness to the end caps around their respective apertures 62 and also provide an extended surface for mating with loading and discharge components, as described herein. It can be appreciated that in some embodiments, the collar 64 at the discharge end 56 may be sized to direct the food parts out of the drum assembly 12 into a basket B, as depicted in the arrangement shown in FIG. 12.

In one embodiment, at least the aperture 62 in the end cap 54 at the discharge end of the rotating drum is aligned with the longitudinal central axis L of the drum and has a diameter D3 that is substantially less than the diameter D2 of the drum. Preferably, the diameter D3 is slightly greater than the size of the food product being discharged from the apparatus 10. Put in other terms, the discharge aperture 62 is positioned and sized so that food product rotating within the drum assembly 12 must be lifted up to the central axis L before it can be discharged. In a specific embodiment, the aperture 62 at the discharge end 56 (and also, preferably, the aperture at the loading end) has a diameter D3 of about half the diameter D2 of the drum.

The drum body 48 may be provided with an aperture 66 in the side wall 49. In one embodiment, this aperture 66 is rectangular in shape and is large enough to accommodate a flow of particulate matter, such as flour or other coating material, from the drum assembly 12 into the sifting table (if present) or into a waste or recapture receptacle (not shown) in other instances. A door 68, of similar shape as the aperture 66, can be removably attached to the drum body 48 to cover the aperture 66. The door 68 can be removably attached or pivotably attached in the manner of a door hinge; however, the door 68 must be secured in such a way as to close off the aperture during the food coating process. When the door 68 is in place over the aperture 66, or in its closed position, the food parts and coating are contained within the drum assembly 12 as it rotates. After the coating process is finished, it is desirable to remove the remaining contents of the drum to allow for cleaning. The door 68 can then be removed, or opened, and the drum assembly 12 rotated to position the aperture 66 over a receptacle so that the remaining contents are removed by gravity feed. The drum 48 can continue to rotate with the door 68 open to dislodge residual particulate material from inside the drum. In one embodiment, the drum body 48 is constructed from a magnetic stainless steel. The door 68 may include magnets to securely attach the door 68 to the drum body 48 while also allowing it to be removable for discharging the contents.

Figure 5:
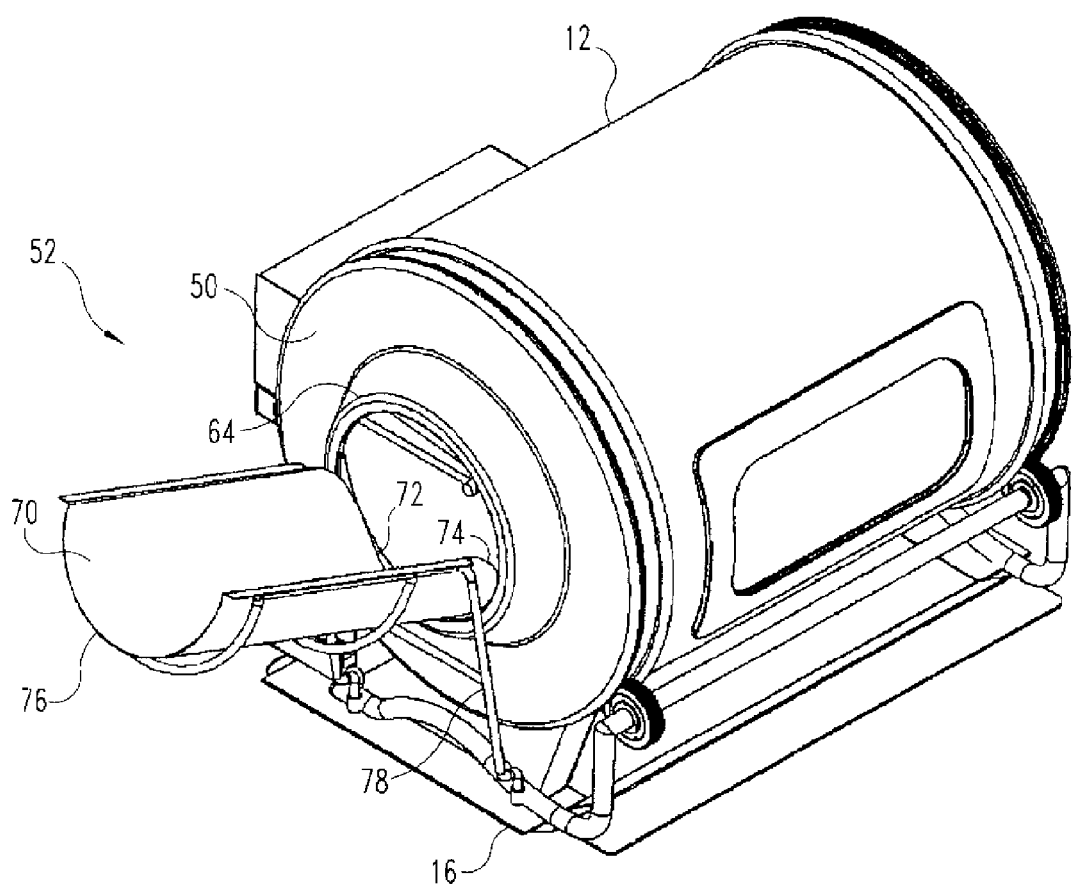
FIG. 5 is a perspective view of the loading chute, support stands, and drum assembly of the apparatus shown in FIG. 1.
Figure 6:
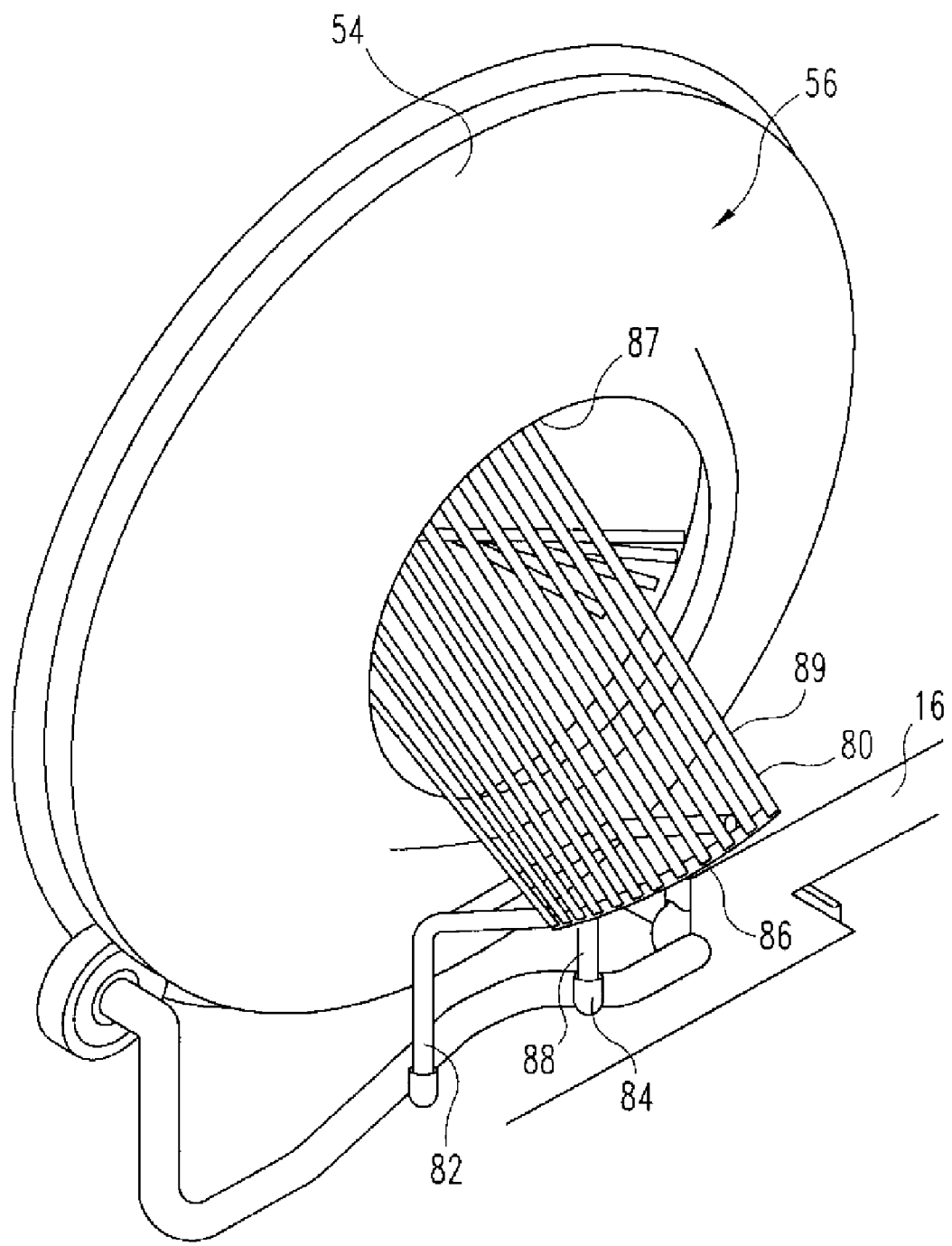
FIG. 6 is a perspective view of the discharge ramp and support stands of the apparatus shown in FIG. 1.
Figure 7:
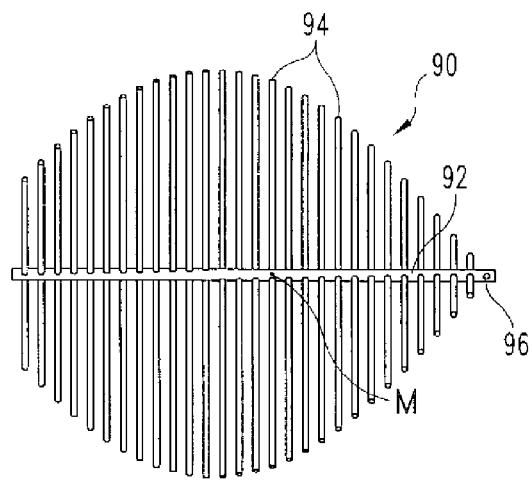
FIG. 7 is a side view of one embodiment of a tumbling grate used with the apparatus shown in FIG. 1.

The apparatus 10 preferably includes a loading chute 70, as shown in FIG. 5, which is used to direct the food product into the drum, typically while the drum is rotating. The loading chute 70 may be an elongated U-shaped channel made from any material suitable for food preparation, such as stainless steel. The loading chute 70 is removably mounted at the loading end 52 of the drum assembly 12 such that a first end of the chute 72 is closely adjacent or even in slidable contact with the collar 64 of the first end cap 50. The exit end or first end 72 of the loading chute 70 may have a rounded edge 74 that is at a smaller diameter than the circular collar to thereby minimize the amount contact between the two surfaces.

A second end 76 of the loading chute 70 may be wider than the first end 72 to provide a large surface onto which the food product may be placed to be fed into the drum. The second end 76 is disposed at an angle above the first end 72 of the loading chute 70. This angle allows the gravity to pull the food parts or coating particulate into the drum assembly 12. In a specific embodiment, the chute 70 is supported at a loading angle of about 30 degrees. The chute 70 may be fastened to support stands 78 that are themselves fastened to the plate 16 or table at a location that allows for proper positioning of the exit end 72 of the chute relative to the rotating drum body 48.

The chute 70 should be long enough to accommodate several parts of food to enhance product through-put. It can also be appreciated that while the chute 70 can be hand loaded with food parts or coating particulate, it is also possible for the chute 70 to be the termination point of a conveyorized assembly line. For instance, food parts may undergo an agglutinating or battering process and may be delivered to the loading chute 70 via a conveyor or other automated means.

Figure 12:
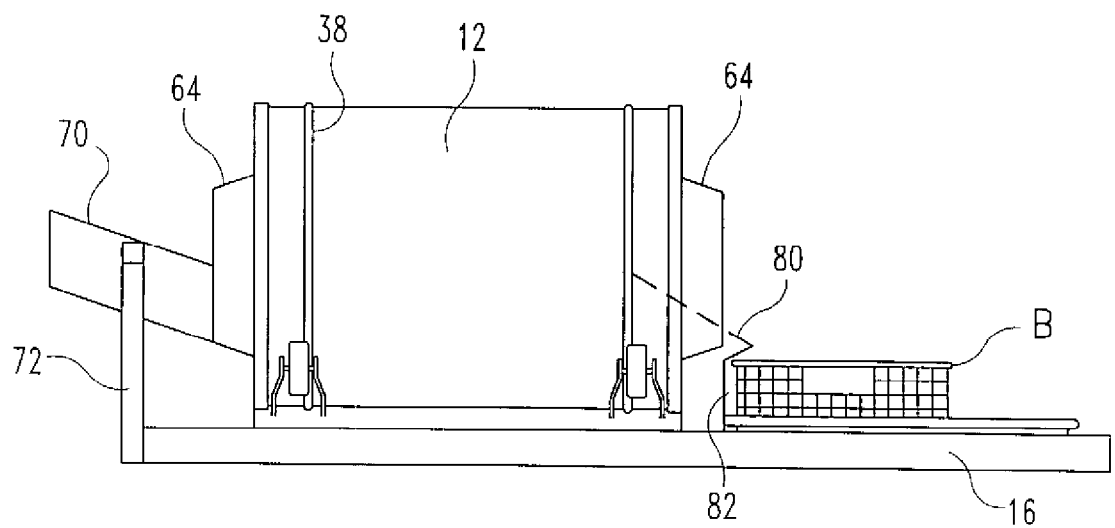
FIG. 12 is a side view of a typical installation at a food preparation facility incorporating the automatic breading apparatus of the present invention.

In the preferred embodiment, the drum assembly 12 also includes a discharge ramp 80. The discharge ramp 80 may be of an elongated U-shaped construction and made from a material suitable for food preparation, such as stainless steel. In one embodiment, the ramp 80 is in the form of a grate so that excess coating or breading material may fall of the food product. The ramp 80 is mounted to the plate 16 or table by support stands 82 that are preferably secured to either side of the discharge ramp 80 at a first end 86. The second end 88 of the support stands are preferably secured directly to the table or to the plate 16. In one embodiment, the plate 16 defines slots 84 sized to removably receive the second ends 88 of the support stands 82 so that the ramp 80 may be easily removed for disassembly or cleaning of the drum assembly. The ramp 80 is preferably configured and mounted such that a first end 87 of the ramp 80 is disposed inside the drum assembly 12 and the second end 89 is lower than the first end 87. In particular, the ramp 80 may be supported at an angle of approximately 45 degrees to facilitate automatic and continuous discharge of the food parts exiting the drum assembly 12. Preferably, the support stands 82 are fabricated in such a way as to allow for most of the discharge ramp 80 to be disposed within the drum assembly 12. As best seen in FIG. 12, this position of the ramp 80, along with its grate design, allows for the food parts to be unloaded expeditiously while the coating particulate falls through the grate to remain inside the drum assembly 12. It can be appreciated that the discharge ramp could be a starting point for an automated deep frying or freezing process and can feed the breaded or coated food product onto a conveyor.

Figure 8:
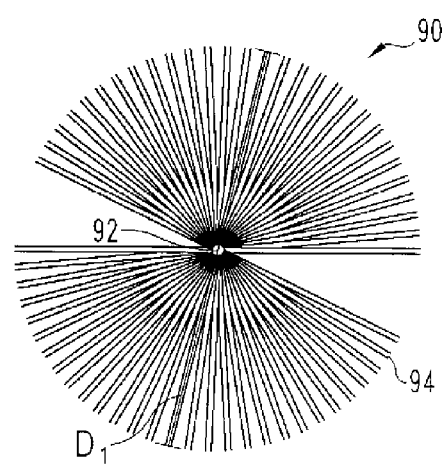
FIG. 8 is a front view of the tumbling grate shown in FIG. 7.
Figure 9:
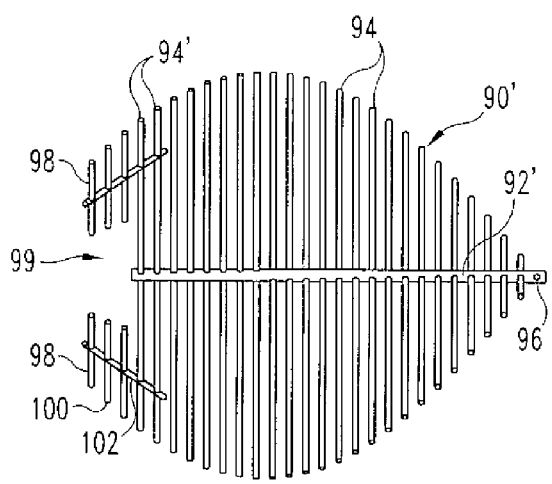
FIG. 9 is a side view of a tumbling grate according to an alternative embodiment incorporating tumbling wings, for use with the apparatus shown in FIG. 1.
Figure 10:
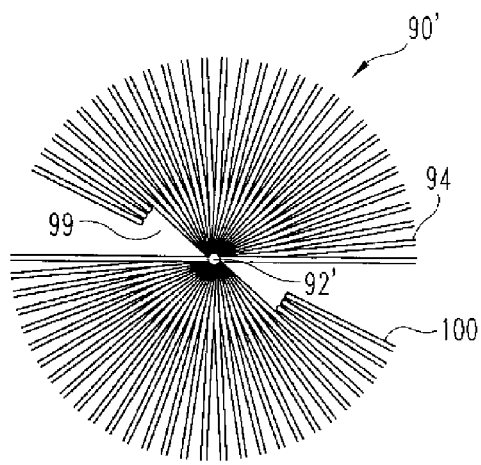
FIG. 10 is a front view of the tumbling grate shown in FIG. 9.
Figure 11:
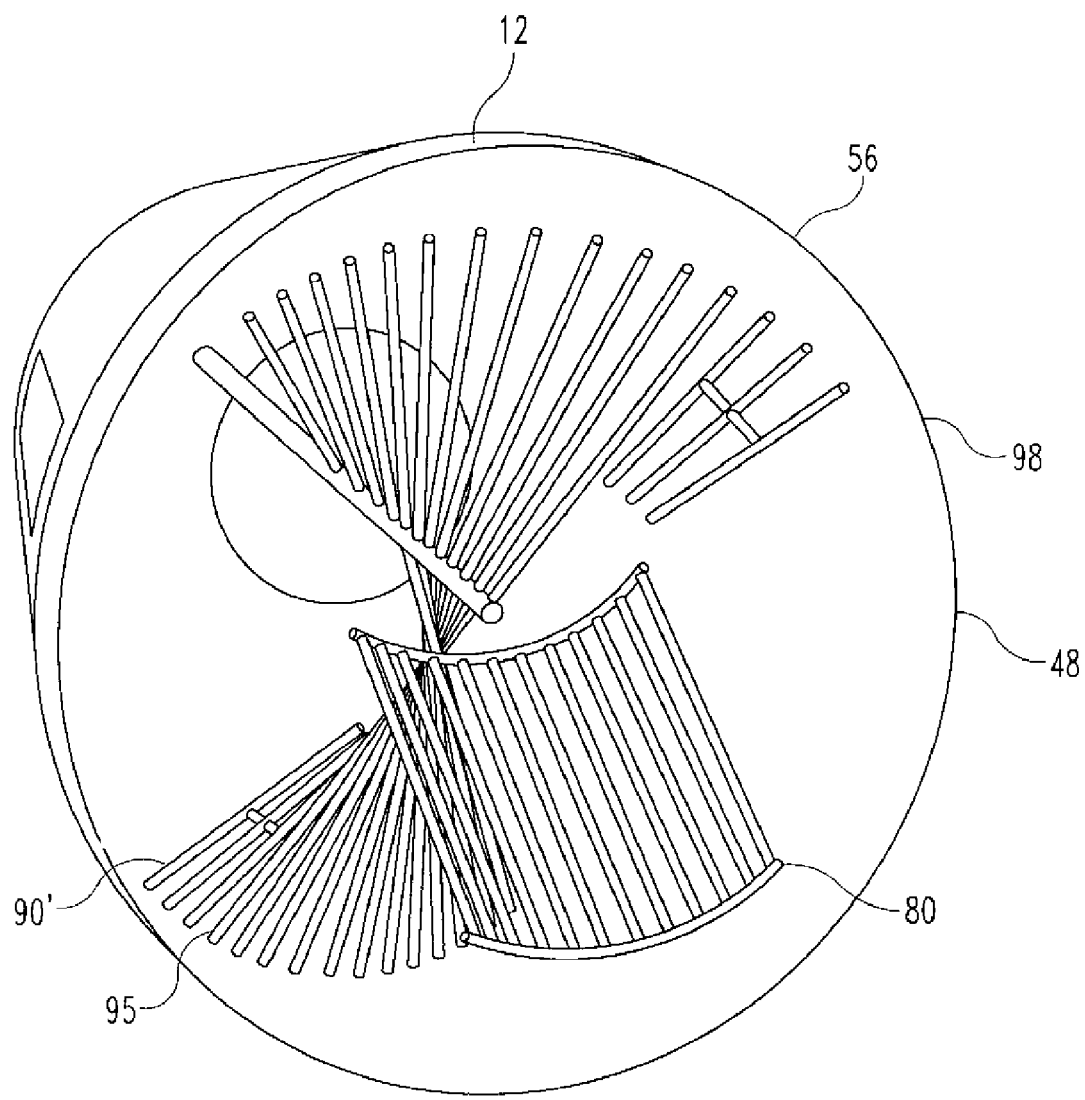
FIG. 11 is an end perspective view inside a drum assembly with the end plate removed to visualize the tumbling grate of FIG. 9 and the orientation of the discharge ramp of FIG. 6.

One feature of the invention is embodied in the tumbling grate 90, shown in FIGS. 7-11. In one embodiment of the invention, the tumbling grate 90 is in a generally spiral configuration best shown in FIG. 11. The grate 90 includes a center axle or rod 92 that is coaxial with the longitudinal axis of the drum body 48 when the grate is assembled inside the drum body. This center rod 92 includes radial rods 94 that project radially outwardly from the center rod 90 in a spiral configuration, as shown in FIGS. 8 and 11. Preferably the diameter D1, shown in FIG. 8, of the spiral formed by the radial rods 94 is approximately equal to the inner diameter D2 of the wall 49 of the drum body shown in FIG. 3. In one embodiment, the tumbling grate 90 is removably engaged to the drum body 48 so that the grate 90 rotates with the drum body 48 when positioned in the drum, but easily removable otherwise. It can be appreciated that removing the tumbling grate 90 from the drum 48 facilitates the cleaning process. In one embodiment, the ends of the radial rods 94 are welded to a thin strip of metal. Small pins 95 (shown in FIG. 11) are attached inside of the drum body 48 which engage the tumbling grate 90 when the drum body 48 is rotated, thus rotating the tumbling grate 90 with the drum body 48. Alternatively, the ends of the radial rods 94 may be welded directly to the drum body 48. As a further alternative, the tumbling grate 90 may be supported independently of the drum body 48 so that the grate 90 can then be rotated independent of the rotation of the drum body 48. In this alternative embodiment, the center rod 92 of the grate 90 is supported and driven by a motor means separate from the drive mechanism 24 used to drive the drum, as described above.

Figure 13:
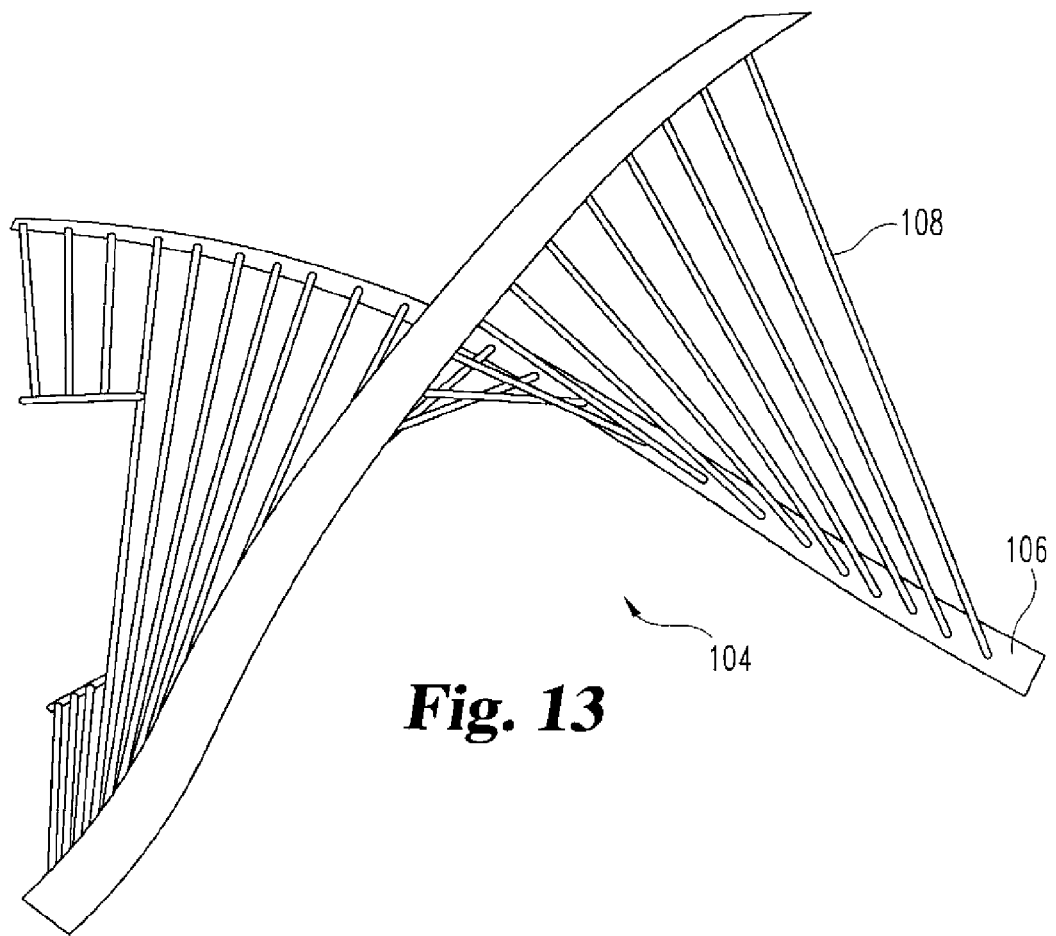
FIG. 13 is a front perspective view of an alternative tumbling grate for use with the food coating apparatus of FIG. 1.

In one form of construction of the grate 90, the center axis rod 92 is drilled with through-holes 96. Each consecutive through-hole 96 is preferably located approximately $11/16$ of an inch from the previous through-hole 96 and angularly spaced approximately 5.5 degrees around the axis of the rod in a counterclockwise direction. Each radial rod 94 may be pressed through a corresponding aperture until the mid-point M of the radial rod 94 is within the center rod 92. In one embodiment, the radial rods 94 are press-fit within the center rod 92; however, in the most preferred embodiment the radial rods 94 are welded to the center rod 92. It is contemplated that the through-hole 96 immediately adjacent the drive end 93 of the center rod 92 does not carry a radial rod. An alternative form of construction of a tumbling grate 104 eliminates the use of the center rod 92, and instead uses two helical strips of material 106 with each radial rod 108 spanning between and attached thereto as shown in FIG. 13.

With the rods in place within the relatively rotated series of through-holes, the grate 90 defines the spiral pattern shown in FIGS. 7-11. In the specific embodiment, twenty-eight radial rods 94 are provided that form the spiral through about 310 degrees, as shown in FIG. 8. The spiral rod or wire tumbling grate 90 of the present invention provides many advantages. First, the rod spiral pattern allows the food parts and the coating particulate to mix together regardless of the location or position of the food parts within the rotating drum. Moreover, the individual radial rods 94 effectively massage the coating particulate into the food parts to provide a consistent coating. The tumbling grate 90 is also advantageous because the food parts are reintroduced to the coating particulate throughout the tumbling process. The open grate configuration (i.e., the space between the radial rods) allows the particular coating or breading material to constantly fall through the grate with each rotation of the drum.

The central spiral arrangement of the tumbling grate 90 also operates to prevent the food parts from riding on the interior surface of the drum body 48 during rotation. In prior automated breading machines, the food parts are substantially continuously in contact with the inner wall of the rotating drum. In some cases, the food piece simply slides along the inner wall so that the entire outer surface of the food is not exposed to the coating/breading material. In accordance with the present invention, the tumbling grate 90 is effective to continually lift the food parts from the surface of the rotating drum and to support or elevate the food piece within the drum interior so that maximum exposure to the coating or breading material is provided.

Another benefit of the tumbling grate 90 is that it acts as an auger as the drum assembly 12 is rotated. In other words, the continuous spiral of the grate continuously propels the food parts toward the discharge end of the rotating drum. It should be noted that the direction of rotation of the drum with reference to the direction (or handedness) of the spiral determines which direction the food parts will flow. For instance, if the spiral is a left handed spiral, the drum assembly must rotate in a direction that is counterclockwise when viewed from the loading end 52 and clockwise when viewed from the discharge end 56. Similarly, if the tumbling grate used a right handed spiral, the rotation of the drum assembly should be clockwise when viewed from the loading end 52 and counterclockwise when viewed from the discharge end 56. It can also be appreciated that the coating particulate is not directed towards the discharge end 56 of the drum assembly 12 by the tumbling grate 90. More specifically, the wire or grate configuration allows the coating particulate to pass through the radial rods 94 of the tumbling grate 90. Thus, more efficient use of a fixed quantity of coating/breading material can be achieved as the particulate is uniformly disposed within the rotating drum, rather than conveyed toward one end the drum, as with prior inclined rotating drum machines.

In a modified embodiment, a tumbling grate 90', as shown in FIGS. 9-11, is generally similar to the spiral grate construction of the grate 90 just described. In this embodiment, the grate 90' is provided with end wings 98. The tumbling grate wings 98 form a gap 99 in the center of the tumbling grate 90' that is positioned at the discharge end 56 (FIGS. 1 and 4) of the drum assembly 12. The wings 98, as best shown in FIG. 9, preferably includes three radial rods 100 that follow the same rotation and spacing pattern as the other radial rods 94 on the center axis rod 92' (although wings 98 that follow different spacing and rotations are also contemplated by this invention). The wing radial rods 100 for each wing 98 are carried by a corresponding support rod 102 that is fastened to one or more radial rods 94' at a second end. The wing support rods 102 have a larger diameter than the radial rods 94', 100 so that the support rods may be provided with through-holes, similar to the through-holes 96 defined in the center rod 92'. Preferably, all of the rods are welded together to form a durable structure. In addition, the ends of the wing radial rods 100 are preferably welded to the inside of the rotating drum body. However, other methods of attaching the wing radial rods are contemplated by this invention. For example, one end of each of the wing radial rods 100 may be attached to a helical strip (not shown) and the other end of each of the wing radial rods 100 may be attached to a wing support rod 102.

The wings 98 are spaced apart to form the gap 99 so that the discharge ramp 80 can be in overlapping position with the wings, as illustrated in FIG. 11. The gap 99 is slightly wider than the width of the wire ramp 80 so that the wings 98 do not contact the ramp as the drum, and ultimately the tumbling grate 90', is rotated. The wings 98 serve to direct the food parts from the center of the drum towards the discharge ramp 80. Because the wings 98 are of the same ribbed configuration as the tumbling grate 90, the particulate coating is not expelled with the food parts.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, the tumbling grates 90, 90' are formed by an assembly of rods welded together, in the illustrated embodiment. Alternatively, the tumbling grates may be formed from sheet stock that is cut or etched to achieve a similar configuration as that depicted in FIGS. 7-10. Moreover, in the most preferred embodiment, the tumbling grates 90, 90' are wound into a single spiral turn (i.e., through less than 360 degrees). However, in certain uses, longer grates and rotations greater than 360 degrees may be contemplated. For instance, in some applications, multiple coatings or breadings may be applied to a food product at different longitudinal positions of the rotating drum. Separate spiral tumbling grates or grate portions may be desired to work the different coatings into the food products, hence the need for a longer travel through the rotating drum.

It can be appreciated that the dimensions of the apparatus 10 of the present invention is generally dictated by the size of the food products being processed. However, while changes in overall dimension may be contemplated, it is important that the radial rods 94 of the spiral tumbling grates 90, 90' not be made with too small diameter relative to the food products. First, the rods must be strong enough to bear the weight of the food products as they are propelled through the rotating drum by the grate. Second, the surface of the rods helps massage the breading material into the food products. Thus, a smaller diameter rod may not have sufficient surface area to adequately work the breading into the surface of the food product. Most preferably, the rods forming the tumbling grate and the chutes are made from ¼ inch bar stainless steel bar stock, although other diameters are contemplated that fulfill the functional characteristics described above. The center rods 92, 92' and support rods 102 are preferably formed from ½ inch diameter bar stock.

The spacing between radial rods 94 may also be dictated by the size of the food products being processed. In the case of large chicken parts, rod spacing of 11/16 inch has been found to be sufficient, leaving a gap of 7/16 inch between adjacent rods. Likewise, the angular spacing between adjacent radial rods is also based on the size of the food product being processed. Again, in the case of large chicken parts, an angular spacing of about 5.5 degrees has been found sufficient. However, other angular offsets may be contemplated, preferably in the range of 4-8 degrees. The angular and axial offsets will nominally determine the number of radial bars forming the tumbling grate for a given length of the center rod.

The radial rods have been described as engaged with the rotating drum so that the tumbling grate will rotate with the drum. However, other constructions are contemplated that constrain the tumbling grate to rotate with the drum. In one alternative, only an end-most radial rod is connected to the drum, such as by passing through aligned holes at the end of the drum. Other constructions are contemplated that hold the spiral grate within the drum during rotation.

We claim:
1. An apparatus for coating a food product comprising:
a drum configured for rotation around a longitudinal central axis of said drum and having a loading end with an opening for receiving a food product, a discharge end with an opening for the discharge of coated food product therefrom and an opening for receiving a coating product;
a generally spiral grate extending within said drum from adjacent said loading end to adjacent said discharge end, said spiral grate having a center rod extending substantially along said longitudinal central axis of said drum, wherein said spiral grate defines a radial gap relative to said longitudinal central axis adjacent said discharge end of said drum;
a drive mechanism for rotating said drum and said spiral grate; and
a discharge ramp adjacent said discharge end of said drum configured to convey food product discharged from said drum away from said drum, wherein said discharge ramp is supported so that a portion of said ramp is disposed within said radial gap.

2. The apparatus for coating a food product of claim 1, wherein said spiral grate is removably engaged with said drum to rotate therewith when engaged.

3. The apparatus for coating a food product of claim 1, wherein said spiral grate includes a plurality of radially disposed rods supported by and spaced along said center rod.

4. The apparatus for coating a food product of claim 3, wherein ends of said plurality of rods are fastened to said drum.

5. The apparatus for coating a food product of claim 3, wherein said plurality of radially disposed rods are angularly offset relative to each other so that said rods form a spiral configuration.

6. The apparatus for coating a food product of claim 5, wherein said plurality of radially disposed rods are angularly offset by about between four (4) and eight (8) degrees.

7. The apparatus for coating a food product of claim 6, wherein the angular offset is about 5.5 degrees.

8. The apparatus for coating a food product of claim 3, wherein said plurality of rods are spaced along said center rod by a distance of less than one (1) inch.

9. The apparatus for coating a food product of claim 8, wherein the spacing along said center rod is 11/16 inch.

10. The apparatus for coating a food product of claim 1, further comprising a loading ramp disposed adjacent said loading end and configured to guide food product placed on said loading ramp into said drum.

11. The apparatus for coating a food product of claim 10, wherein said loading ramp is supported at a downward angle toward said drum relative to said longitudinal central axis of said drum.

12. The food coating apparatus of claim 1, wherein said discharge ramp is supported at a downward angle away from said drum relative to said longitudinal central axis of said drum.

13. The food coating apparatus of claim 1, wherein said discharge ramp is a wire grate.

14. The food coating apparatus of claim 1, further comprising end caps closing said loading and discharge ends of said drum, each of said end caps defining an aperture for the passage of food product therethrough.

15. The food coating apparatus of claim 14, wherein said aperture in each of said end caps is centered on said longitudinal central axis.

16. The food coating apparatus of claim 1, wherein said opening for receiving a coating product is an aperture separate from said loading end opening and said discharge end opening.

* * * * *